United States Patent [19]

Akiyama et al.

[11] 3,920,880

[45] Nov. 18, 1975

[54] ELECTROSTATIC RECORDING MATERIAL

[75] Inventors: Toyomi Akiyama, Sakai; Taiji Higaki, Nishinomiya; Eiichiro Shiratsuchi, Tokyo; Yoshiyuki Ishibashi; Eijiro Tagami, both of Yokkaichi, all of Japan

[73] Assignees: Japan Synthetic Rubber Co., Ltd.; Kanzaki Paper Manufacturing Co., Ltd., both of Tokyo, Japan

[22] Filed: Sept. 7, 1973

[21] Appl. No.: 396,253

[30] Foreign Application Priority Data

Sept. 5, 1972 Japan.............................. 47-88838

[52] U.S. Cl. ................. 428/500; 427/58; 427/121; 428/522; 428/523
[51] Int. Cl.$^2$............................................ B44D 1/18
[58] Field of Search ...... 117/201, 155 UA, 161 UT, 117/161 UD, 161 UH, 161 UC; 96/1.5, 1.8, 1 C

[56] References Cited
UNITED STATES PATENTS

| | | | |
|---|---|---|---|
| 2,875,054 | 2/1954 | Griggs et al.................. | 117/155 UA |
| 3,048,501 | 8/1962 | Miller et al. ................. | 117/155 UA |

*Primary Examiner*—Cameron K. Weiffenbach
*Attorney, Agent, or Firm*—Ladas, Parry, Von Gehr, Goldsmith & Deschamps

[57] ABSTRACT

Improved electrostatic recording material having a mat-finish surface and excellent electrostatic recording characteristics and capable of being written thereupon by conventional ink pens, lead pencils, and ballpoint pens and also capable of receiving impression made by conventional rubber stamps or printing processes can be made by coating a base sheet with a composition comprising (I) 10 to 90 parts by weight (as solids) of at least one member selected from the group consisting of (A) an aqueous solution of an amine or ammonium salt of a copolymer having a film-formability at a temperature not higher than 70°C and composed of (a) 8 to 50 mole percent in terms of free carboxyl group) of a carboxyl group-containing polymerizable monomer and (b) 92 to 50 mole percent of at least one monomer selected from the group consisting of an ethylenic monomer and a conjugated diolefinic monomer and (b) an aqueous dispersion of a polymer having a film-formability at a temperature not higher than 70°C prepared by polymerizing (a') 100 parts by weight of at least one monomer selected from the group consisting of an ethylenic monomer and a conjugated diolefinic monomer in (b') 1 to 200 parts by weight (as solids) of an aqueous solution of an amine or ammonium salt of a copolymer composed of an unsaturated carboxylic acid and at least one monomer selected from the group consisting of an ethylenic monomer and a conjugated diolefinic monomer, and (II) 90 to 10 parts by weight (as solids) of an aqueous dispersion of a water-insoluble homopolymer or copolymer having no film-formability at a temperature not higher than 70°C and having an average particle size of 1 to 20$\mu$ prepared by emulsion or suspension-polymerizing at least one monomer selected from an ethylenic monomer and a conjugated diolefinic monomer, and drying the resulting assembly.

19 Claims, No Drawings

ELECTROSTATIC RECORDING MATERIAL

This invention relates to a novel electrostatic recording material. More particularly, this invention pertains to a novel electrostatic recording material prepared by coating a base sheet with an aqueous dispersion of a water-insoluble homopolymer or copolymer having a particle size of 1 to 20$\mu$ and having no film-formability at a temperature not higher than 70°C in an aqueous solution or dispersion containing an amine or ammonium salt of a copolymer having carboxyl groups, and then drying the resulting assembly.

U.S. Pat. No. 3,634,135 discloses a method for making an electrostatic recording sheet comprising coating an electrically conductive base sheet with a dispersion in an organic solvent of a film-forming, insulating polymer and insulating or dielectric heterogeneously polymerized solid polymeric particles. Although the electrostatic recording sheet obtained by this method has a mat-finish surface and excellent electrostatic recording characteristics and is capable of being written thereupon by conventional ink pens, lead pencils, ballpoint pens and capable of receiving impressions made by conventional rubber stamps or printing processes, it is disadvantageous in that an organic solvent must be used which is undesirable in respects of inflammability, toxicity, handling, economy and the like. Therefore, it has been desired that such an electrostatic recording material be obtained by using an aqueous dispersion of polymers. In addition, it has hitherto been diffciult to prepare an aqueous dispersion of polymers having a particle size of 1 to 20$\mu$ by conventional emulsion or suspension polymerization in an aqueous medium.

The present inventors have done extensive research on the preparation of such an aqueous dispersion to find a satisfactory method thereof, and have succeeded in obtaining a satisfactory electrostatic recording material by using the aqueous dispersion of polymers.

An object of this invention is to provide a novel electrostatic recording material.

Another object of the invention is to provide an electrostatic recording material having a very uniform roughened surface on which a clear image can still be recorded.

A further object of the invention is to provide an electrostatic recording sheet having a substantially mat-finished appearance similar to the commonly used business papers.

A still further object is to provide a process for the production of an electrostatic recording sheet using an aqueous dispersion of polymers.

Other objects and advantages of this invention will become apparent from the following description.

According to this invention, there is provided an electrostatic recording material obtained by coating a base sheet with a composition comprising (I) 10 to 90 parts by weight (as solids) of at least one member selected from the group consisting of (A) an aqueous solution of an amine or ammonium salt of a copolymer having a film-formability at a temperature not higher than 70°C, preferably at room temperature and consisting of (a) 8 to 50 mole percent (in terms of free carboxyl group) of a carboxyl group-containing ethylenically unsaturated monomer and (b) 92 to 50 mole percent of at least one monomer selected from the group consisting of an ethylenic monomer and a conjugated diolefinic monomer and (B) an aqueous dispersion of a polymer having a film-formability at a temperature not higher than 70°C, preferably at room temperature prepared by polymerizing (a') 100 parts by weight of at least one monomer selected from the group consisting of an ethylenic monomer and a conjugated diolefinic monomer in the presence of (b') 1 to 200, preferably 1 to 30, parts by weight (as solids) of an aqueous solution of an amine or ammonium salt of a copolymer consisting of (i) 8 to 50 mole percent (in terms of free carboxyl group) of a carboxyl group-containing ethylenically unsaturated monomer and (ii) 92 to 50 mole percent of at least one monomer selected from the group consisting of an ethylenic monomer and a conjugated diolefinic monomer, and (II) 90 to 10 parts by weight (as solids) of an aqueous dispersion of a water-insoluble homopolymer or copolymer having no film-formability at a temperature not higher than 70°C and having a weight average particle size of 1 to 20$\mu$, preferably 1 to 5$\mu$ prepared by emulsion or suspension polymerizing at least one monomer selected from the group consisting of an ethylenic monomer and a conjugated diolefinic monomer in an aqueous medium, and then drying the resulting assembly.

The electrostatic recording material of this invention includes a layer of an electric-charge-retentive component substantially consisting of dielectric or insulating resinous polymer film on an electrically conductive base sheet, and said insulating resinous polymer film is composed at least partially of dielectric or insulating polymeric solid particles which are so adhered to the surface of the base sheet with the film-formable polymer as to make the same uniformly rough.

The insulating resinous polymer materials forming the electric-charge-retentive layer is mainly composed of at least one polymer selected from the group consisting of (A) a copolymer having a filmformability at a temperature not higher than 70°C and consisting of (a) 8 to 50 mole percent (in terms of free carboxyl group) of a carboxyl group-containing ethylenically unsaturated monomer and (b) 92 to 50 mole percent of at least one monomer selected from the group consisting of an ethylenic monomer and a conjugated diolefinic monomer and (B) a polymer having a filmformability at a temperature not higher than 70°C prepared by polymerizing (a') 100 parts by weight of at least one monomer selected from the group consisting of an ethylenic monomer and a conjugated diolefinic monomer in the presence of (b') 1 to 200, preferably 1 to 30, parts by weight (as solids) of an aqueous solution of an amine or ammonium salt of a copolymer consisting of (i) 8 to 50 mole percent (in terms of free carboxyl group) of a carboxyl group-containing ethylenically unsaturated monomer and (ii) 92 to 50 mole percent of at least one monomer selected from the group consisting of an ethylenic monomer and a conjugated diolefinic monomer. And particularly, the resinous polymer material consists partially of polymeric solid particles of homopolymer or copolymer having no film-formability at a temperature not higher than 70°C prepared by emulsion or suspension polymerization of at least one monomer selected from the group consisting of an ethylenic monomer and a conjugated diolefinic monomer, said particles having a weight average size of 1 to 20$\mu$.

The carboxyl group-containing ethylenically unsaturated monomer (a) or (i) which is one of the constituents of the copolymer (A) or (b') includes ethylenically unsaturated carboxylic acids, for example, acrylic, methacrylic, crotonic, itaconic, maleic and fumaric acids and the like, and partial esters of polybasic ethylenically unsaturated carboxylic acids, and the ethylenic monomer to be copolymerized with the carboxyl group-containing ethylenically unsaturated monomer (a) or (i) includes, for instance, vinyl aromatic compounds, such as styrene, vinyltoluene, halogenated styrene, α-methylstyrene; straight or branched chain olefins, such as ethylene, propylene, isobutylene or the like; alkyl acrylates or methacrylates having 1 to 12 carbon atoms in the alkyl group such as methyl acrylate, ethyl acrylate, butyl acrylate, 2-ethylhexyl acrylate, methyl methacrylate, ethyl methacrylate, butyl methacrylate, lauryl methacrylate, or the like; polyethylene glycol acrylates or methacrylates; vinyl cyanides, such as acrylonitrile, methacrylonitrile or the like; vinyl ethers, such as isopropyl vinyl ether, methyl vinyl ether; and vinyl halides, such as vinyl chloride, vinylidene chloride. The conjugated diolefinic monomer which is also to be copolymerized with the carboxyl group-containing ethylenically unsaturated monomer (a) or (i) includes for example, butadiene, isoprene, chloroprene, piperylene, cyclopentadiene or the like.

The ethylenic and conjugated diolefinic monomers (a') which are constituents of the polymer (B) include those mentioned above for the copolymer (A) or (b').

In the copolymer (A) or (b'), too high a carboxyl group content adversely affects the recording characteristics, and hence, the proportion of the carboxyl group-containing ethylenically unsaturated monomer in the copolymer (A) or (b') is 8 to 50 mole percent in terms of free carboxyl group in practice, and preferably 10 to 45 mole percent. When the proportion is less than 8 mole percent, the desired watersolubility of the copolymer cannot be achieved, and when the proportion exceeds 50 mole percent, the recording characteristics are deteriorated.

The monomers constituting the homopolymer or copolymer having no film-formability at a temperature not higher than 70°C and having a weight average particle size of 1 to 20μ prepared by emulsion or suspension polymerization include, for instance, vinyl aromatic compounds, such as styrene, α-methylstyrene, halogenated styrenes, vinyltoluene, divnylbenzene; alkyl acrylates or methacrylates having 1 to 12 carbon atoms in the alkyl groups, such as methyl acrylate, ethyl acrylate, butyl acrylate, 2-ethylhexyl acrylate, methyl methacrylate, ethyl methacrylate, butyl methacrylate, lauryl methacrylate or the like; and vinyl halides, such as vinyl chloride or vinylidene chloride and monoolefins such as isobutylene for the ethylenic monomer, and butadiene, isoprene and piperylene for the conjugated diolefinic monomer. The kind and proportion of these monomers are selected so that the homopolymer or copolymer has no film-formability at a temperature not higher than 70°C. Preferred are homopolymers of vinyl aromatic compounds, especially styrene, and homopolymer of methyl methacrylate and copolymers comprising at least 90 % by weight of a vinyl aromatic compound and/or methyl methacrylate.

The particles of the homopolymer or copolymer (II) are required to have a sufficiently larger size than the wave length of visible light i.e., 400–900 mμ, in order to impart to the surface of the insulating or dielectric resinous layer a sufficient roughness for scattering the incident light. Therefore, the particles are required to have a weight average diameter of at least 1μ. On the other hand, when the particles are too large, the recording quality is deteriorated. Therefore, the particle diameter should not exceeds 20μ. A preferred range is 1 to 5μ.

Various methods may be used to obtain the composition comprising the components (I) and (II). The simplest method is mere blending the components (I) and (II), and in some case, the two components may be blended in the course of polymerization. For example, the component (II) may be prepared by polymerization in the component (I). In the emulsion or suspension polymerization for the component (II), an emulsifier or a dispersing agent is used and the selection of an appropriate emulsifer or dispersing agent is very important because it affects the electric characteristics of the present electrostatic recording material. The most preferable emulsifier or dispersing agent is the component (A) or (b'), and other suitable ones are ammonium or amine salts of saturated or unsaturated fatty acids having at least 8 carbon atoms; ammonium or amine salts of monoesters of dibasic carboxylic acids with higher aliphatic alcohols having at least 7 carbon atoms. These may be used alone or in admixture of two or more. The use of these emulsifiers or dispersing agents result in a stable dispersion of polymer particles which does not adversely affect the electric characteristics of the recording material.

It is necessary that the polymer particles which are the component (II) be contained in a proper proportion in the aqueous dispersion in order to impart a mat-finished appearance similar to the commonly used business paper, writability and printability by proper roughening, and enhancement of recording characteristics and a practical strength of the resinous layer. Such a proper proportion may vary in a certain range corresponding to the particle size range of 1 to 20μ, though 90 to 10 parts by weight of the polymer particles should be contained per 10 to 90 parts by weight of the component (I).

In the electrostatic recording material obtained by the process of this invention, the electriccharge-retentive layer is formed of an aqueous dispersion of a polymer having the specific composition as mentioned above, whereby a very paper-like appearance is obtained and a rough surface having good recording characteristics is achieved without deteriorating the recording adaptability, such as insulation resistance, moisture absorption, wear of recording terminals.

To the aqueous dispersion of the polymer may be added other additives in such amounts that the characteristics of the electrostatic recording material are not impaired according to purposes, for example, inorganic pigments, such as clay, talc, silicic acid, silicon oxide, titanium oxide, non-photoconductive zinc oxide, barium sulfate and the like or additives conventionally used in the production of electrostatic recording materials, such as fluorescent dyes, coloring dyes, pigment-dispersing agents, plasticizers, antifoaming agents or the like. The aqueous dispersion of polymer can be coated on the base sheet by means of a conventional coating machine, such as air-knife coater, roll coater, blade coater or the like. The base sheet may be a cellulose fiber paper, a synthetic fiber paper, a synthetic film paper, a plastic film, a metal foil or the like, and these may suitably be selected according to purposes. The cellulose fiber paper is easiest to use because it is inexpensive, and easy to process. The base sheet is required to have a proper physical strength, smoothness, dimension stability, whiteness, bulkiness, thickness and the like, and may be subjected to low resistance treatment depending upon the quality of material. This is effected for the purpose of enhancing the recording efficiency by making thin the effective film thickness of the electric-charge-retentive layer of the recording material and preventing the uneven electrification. In the case of, for example, a paper base sheet, in general, it has hitherto been subjected to low resistance treatment with an inorganic salt, a metal powder or a high polymer electrolyte such as polyvinylbenzyl ammonium chloride, polyethylene sulfonate, polyacrylic acid salt or the like.

In the course of coating, the polymer particles should not be heated for drying at a temperature exceeding the inherent film-forming temperature of the polymer particles. However, the drying may be effected with hot air at a temperature exceeding the film-forming temperature of the polymer particles as far as the temperature is not too high, and the polymer particles will not undergo plastic deformation thereby.

The term "film-forming temperature" used herein means the temperature measured according to the method disclosed in, for instance, H. Warson, The Applications of Synthetic Resin Emulsions, pp. 141–147 (Ernest Benn, Ltd.) or T. F. Protzman and G. L. Brown, J. Appl. Polym. Sci., 4, 81–85 (1960).

This invention is further specifically explained by referring to Examples, which are by way of illustration and not by way of limitation. In the Examples, parts and percent are by weight unless otherwise specified.

EXAMPLE 1

50 Parts (as solids) of (I) an aqueous solution of an ammonium salt of a copolymer having a film-formability at room temperature consisting of 30.9 mole percent of butadiene, 24.0 mole percent of styrene, 20.8 mole percent of methyl methacrylate and 24.3 mole percent of methacrylic acid was mixed with 50 parts (as solids) of (II) an aqueous dispersion prepared by suspension-polymerizing 92 parts of styrene in the presence of an aqueous ammoniacal solution of 8 parts of a copolymer consisting of 12.0 mole percent of styrene, 66.0 mole percent of methyl methacrylate and 15 mole percent of methacrylic acid, 0.8 part of t.-dodecyl mercaptan and 1 part of azobisisobutyronitrile at an initial temperature of 50°C for two hours (the weight average particle size determined by electronmicroscope: 12,000 A; the minimum film-forming temperature: 96°C) to obtain an aqueous dispersion containing 30 % of polymer. This dispersion was coated on one side of a base paper of 58 g/m² subjected to low resistance treatment with a sodium salt of polystyrene sulfonic acid and then dried at about 80°C to form an electric-charge-retentive layer of 6$\mu$ in thickness.

The thus obtained electrostatic recording material had a glossless appearance, a good writability, a good recording property and a surface resistivity of $10^{12}$ $\Omega$-cm at 20°C, a relative humidity of 60 % and 100 V of DC. Pulse signals of $-750$ V and $10\mu$ sec were impressed onto the electrostatic recording material by means of a single stylus recording head having a line density of 6 lines/cm to form electrostatic images, and the thus impressed recording material was subjected to magnetic brush development by a toner for the negative charge development, to obtain clear recording images having a very good contrast. A latent image formed on a commercially available zinc oxide photosensitive paper by a conventional electron photography was transferred to the above electrostatic recording material by a short circuit method without bias and then developed by a magnetic brush method to obtain a clear image. In this case, the voltage of the latent image part of the zinc oxide photosensitive paper was $-400$ V, and the voltage of the surface of the electrostatic recording material after transferring operation was $-120$ V.

EXAMPLE 2

The same procedure as in Example 1 was repeated, except that an aqueous dispersion obtained by suspension-polymerizing 30 parts of butadiene and 60 parts of styrene in an aqueous ammoniacal solution of 8 parts of a copolymer consisting of 19.0 mole percent of styrene, 66.0 mole percent of methyl methacrylate and 15.0 mole percent of methacrylic acid (the resulting polymer had a film-formability at room temperature) was used as the (I) component to obtain a recording material having a glossless appearance, a good writability, and a good recording property similar to those in Example 1.

EXAMPLE 3

The same procedure as in Example 1 was repeated, except that (A) an aqueous solution of an ammonium salt of a copolymer having a film-formability at room temperature consisting of 42.4 mole percent of butyl acrylate, 26.0 mole percent of styrene and 31.6 mole percent of methacrylic acid and (B) an aqueous dispersion obtained by suspension-polymerizing 40 parts of butadiene and 52 parts of styrene in an aqueous ammoniacal solution of 8 parts of a copolymer of 19.0 mole percent of styrene, 66.0 mole percent of methyl methacrylate and 15.0 mole percent of methacrylic acid (the resulting polymer had a film-formability at room temperature) were used as the (I) component, and that the weight ratio of (A):(B):(II) (as solids) was 30:30:40 to obtain a recording material similar to that in Example 1.

EXAMPLE 4

30 Parts (as solids) of (I) an aqueous solution of an ammonium salt of a copolymer having a film-formability at room temperature and consisting of 91 mole percent of ethylene and 9 mole percent of acrylic acid was mixed with 70 parts (as solids) of the same component (II) as in Example 1 to obtain an aqueous dispersion containing 30 % of polymer. Using this aqueous dispersion in the same manner as in Example 1 an electrostatic recording material was prepared and tested for recording adaptability and writability to find that the recording material was excellent as in Example 1.

EXAMPLES 5–14

The aqueous ammoniacal solutions of carboxyl group-containing copolymers having a film-formability at room temperature shown in Table 1 as component (I) and the same (II) component as in Example 1 were used to produce electrostatic recording materials in the same manner as in Example 1. All the recording materials thus obtained had excellent performance.

Table 1

| Example No. | 5 | 6 | 7 | 8 | 9 | 10 | 11 | 12 | 13 | 14 |
|---|---|---|---|---|---|---|---|---|---|---|
| (I) (mole percent) | | | | | | | | | | |
| Butadiene | — | — | — | — | — | — | 32.1 | 30.9 | 30.9 | 30.9 |
| Ethyl acrylate | 19.3 | 19.4 | 19.6 | 19.8 | 17.3 | — | — | — | — | — |
| Butyl acrylate | — | — | — | — | — | 42.8 | — | — | — | — |
| Styrene | 9.3 | 28.0 | 47.0 | 19.1 | 16.6 | 23.4 | 16.7 | 24.0 | 24.0 | 24.0 |
| Methyl methacrylate | 43.4 | 24.3 | 4.9 | 49.6 | 25.9 | — | 26.1 | 20.8 | 20.8 | 20.8 |
| Methacrylic acid | 28.0 | 28.3 | 28.5 | 11.5 | 40.2 | — | 15.1 | 24.3 | 24.3 | 24.3 |
| Acrylic acid | — | — | — | — | — | 33.8 | — | — | — | — |
| Itaconic acid | — | — | — | — | — | — | 10.0 | — | — | — |
| Parts as solids | 50 | 50 | 50 | 50 | 50 | 50 | 50 | 90 | 40 | 20 |
| (II) | | | | | | | | | | |
| Parts as solids | 50 | 50 | 50 | 50 | 50 | 50 | 50 | 10 | 60 | 80 |

EXAMPLE 15

The same procedure as in Example 1 was repeated, except that an aqueous dispersion obtained by suspension-polymerizing 40 parts of butadiene and 48 parts of styrene in an aqueous ammoniacal solution of 12 parts of a copolymer consisting of 43.4 mole percent of butadiene, 43.0 mole percent of methyl methacrylate and 13.6 mole percent of methacrylic acid (the resulting copolymer had a film-formability at room temperature) was used as the (I) component and that the weight ratio of (I) to (II) was 60 : 40 to obtain a recording material similar to that in Example 1.

EXAMPLE 16

The same procedure as in Example 1 was repeated, except that an aqueous dispersion obtained by suspension-polymerizing 50 parts of styrene and 42 parts of methyl methacrylate in an aqueous ammoniacal solution of 8 parts of a copolymer consisting of 19.0 mole percent of styrene, 66.0 mole percent of methyl methacrylate and 15.0 mole percent of methacrylic acid (the weight average particle size determined by electronmicroscope: 2.2μ; the minimum film-forming temperature: higher than 100°C) was substituted for the (II) component and that the weight ratio of the (I) component to the (II) component was 50:50 to obtain a recording material similar to that in Example 1.

EXAMPLE 17

The same procedure as in Example 1 was repeated, except that an aqueous dispersion obtained by seed polymerizing 500 parts of styrene emulsified with 10 parts of ammonium oleate using as the seed latex 100 parts (as solids) of a latex obtained by emulsionpolymerizing 20 parts of butadiene and 70 parts of styrene in an aqueous ammoniacal solution of a copolymer consisting of 19.0 mole percent of styrene, 66.0 mole percent of methyl methacrylate and 15.0 mole percent of methacrylic acid (the weight average particle size determined by electronmicroscope: 1.47μ; the minimum film-forming temperature: 93°C) was substituted for the (II) component to obtain a recording material similar to that in Example 1.

EXAMPLE 18

The same procedure as in Example 1 was repeated, except that an aqueous dispersion obtained by suspension-polymerizing 94 parts of styrene in an aqueous ammoniacal solution of 6 parts of a copolymer consisting of 19.0 mole percent of styrene, 66.0 mole percent of methyl methacrylate and 15.0 mole percent of methacrylic acid (the weight average particle size determined by electronmicroscope: 3.5μ; the minimum film-forming temperature: 92°C) was substituted for the (II) component to obtain a recording material similar to that in Example 1.

Control 1

The same procedure as in Example 1 was repeated, except that an aqueous dispersion obtained by suspension-polymerizing 64 parts of styrene and 24 parts of methyl methacrylate in an aqueous ammoniacal solution of 12 parts of a copolymer consisting of 19.0 mole percent of styrene, 66.0 mole percent of methyl methacrylate and 15.0 mole percent of methacrylic acid (the weight average particle size determined by electronmicroscope: 0.8μ; the minimum filmforming temperature: higher than 100°C) was substituted for the (II) component. The resulting electrostatic recording material was not sufficiently glossless.

Control 2

The same procedure as in Example 1 was repeated, except that an aqueous dispersion obtained by suspensionpolymerizing 80 parts of styrene in an aqueous ammoniacal solution of 20 parts of a copolymer consisting of 19.0 mole percent of styrene, 66.0 mole percent of methyl methacrylate and 15.0 mole percent of methacrylic acid (the weight average particle size determined by electronmicroscope: 0.1μ; the minimum film-forming temperature: higher than 100°C) was substituted for the (II) component. The resulting electrostatic recording material was not glossless, and was inferior in writability.

Control 3

The same procedure as in Example 1 was repeated, except that the (II) component was not used. The resulting electrostatic recording material was inferior in writability and had an unnatural gloss.

Control 4

The same procedure as in Example 2 was repeated, except that the (II) component was not used. The result was the same as in Control 3.

Control 5

The same procedure as in Example 3 was repeated, except that the (II) component was not used. The resulting electrostatic recording material was inferior in writability and had an unnatural gloss.

Control 6

The same procedure as in Example 1 was repeated, except that an aqueous dispersion obtained by suspensionpolymerizing 30 parts of butadiene and 60 parts of styrene in an aqueous ammoniacal solution of 10 parts of a copolymer consisting of 19.0 mole percent of styrene, 66.0 mole percent of methyl methacrylate and 15.0 mole percent of methacrylic acid (the weight average particle size determined by electronmicroscope: 1.76$\mu$; the minimum film-forming temperature; 50°C) was substituted for the (II) component. The resulting electrostatic recording material was inferior in writability and had an unnatural gloss.

What is claimed is:

1. An electrostatic recording material obtained by coating a base sheet with a composition comprising (I) 10 to 90 parts by weight (as solids) of at least one member selected from the group consisting of
   A. an aqueous solution of an amine or ammonium salt of a copolymer having a film-formability at a temperature not higher than 70°C and composed of
      a. 8 to 50 mole percent (in terms of free carboxyl group) of a carboxyl group-containing ethylenically unsaturated monomer and
      b. 92 to 50 mole percent of at least one monomer selected from the group consisting of an ethylenic monomer and a conjugated diolefinic monomer and
   B. an aqueous dispersion of a polymer having a film-formability at a temperature not higher than 70°C prepared by polymerizing
      a'. 100 parts by weight of at least one monomer selected from the group consisting of an ethylenic monomer and a conjugated diolefinic monomer in the presence of
      b'. 1 to 200 parts by weight (as solids) of an aqueous solution of an amine or ammonium salt of a copolymer composed of
         i. 8 to 50 mole percent (in terms of free carboxyl group) of a carboxyl group-containing ethylenically unsaturated monomer and
         ii. 92 to 50 mole percent of at least one monomer selected from the group consisting of an ethylenic monomer and a conjugated diolefinic monomer;
(II) 90 to 10 parts by weight (as solids) of an aqueous dispersion of a water-insoluble homopolymer or copolymer having no film-formability at a temperature not higher than 70°C and having a weight average particle size of 1 to 20$\mu$ prepared by emulsion or suspension-polymerizing at least one monomer selected from the group consisting of an ethylenic monomer and a conjugated diolefinic monomer in an aqueous medium and then drying the resulting assembly.

2. An electrostatic recording material according to claim 1, wherein the amount of the (a) or (i) component is 10 to 45 mole percent.

3. An electrostatic recording material according to claim 1, wherein the copolymer (A) or the polymer (B) has a film-formability at room temperature.

4. An electrostatic recording material according to claim 1, wherein the homopolymer or copolymer (II) is prepared by emulsion or suspension-polymerizing at least one monomer selected from the group consisting of vinyl aromatic compounds, alkyl acrylates and methacrylates having 1 to 12 carbon atoms in the alkyl group, halogenated vinyl compounds, monoolefins and conjugated diolefins.

5. An electrostatic recording material according to claim 1, wherein the (II) component is an aqueous dispersion of polystyrene.

6. An electrostatic recording material according to claim 1, wherein the polymerization is effected in the presence of the (A) or (b') component.

7. An electrostatic recording material according to claim 1, wherein the (II) component has a weight average particle size 1 to 5$\mu$.

8. An electrostatic recording material according to claim 1, wherein the amount of the (b') component is 1 to 30 parts by weight.

9. An electrostatic recording material according to claim 1, wherein the base sheet is a cellulose fiber paper, a synthetic fiber paper, a synthetic film, a plastic film or a metal foil.

10. An electrostatic recording material according to claim 1, wherein the ethylenic monomer of (b), (a'), or (ii) is selected from the group consisting of vinyl aromatic compounds, straight or branched olefins, alkyl acrylates and methacrylates having 1 to 12 carbon atoms in the alkyl group, polyethylene glycol acrylates and methacrylates, vinyl cyanides, vinyl ethers and vinyl halides.

11. An electrostatic recording material according to claim 1, wherein the conjugated diolefinic monomer of (b), (a') or (ii) is selected from the group consisting of butadiene, isoprene, chloroprene, piperylene, and cyclopentadiene.

12. An electrostatic recording material according to claim 1, wherein the conjugated diolefinic monomer of (II) is selected from the group consisting if isoprene, piperylene and butadiene.

13. An electrostatic recording material according to claim 1, wherein the carboxyl group-containing ethylenically unsaturated monomer (a) or (i) is an ethylenically unsaturated carboxylic acid.

14. An electrostatic recording material according to claim 13, wherein the ethylenically unsaturated carboxylic acid is selected from the group consisting of acrylic, mathacrylic, crotonic, itaconic, maleic and fumaric acids.

15. An electrostatic recording material according to claim 1, wherein the ethylenic monomer of (II) is selected from the group consisting of vinyl aromatic compounds, alkyl acrylates and methacrylates having 1 to 12 carbon atoms in the alkyl group, halogenated vinyl compounds, and monoolefins.

16. An electrostatic recording material according to claim 15, wherein the vinyl aromatic compounds are styrene, $\alpha$-methylstyrene, halogenated styrenes, vinyltoluene and divinylbenzene.

17. An electrostatic recording material according to claim 15, wherein the alkyl acrylates and methacrylates having 1 to 12 carbon atoms in the alkyl group are methyl acrylate, ethyl acrylate, butyl acrylate, 2-ethylhexyl acrylate, methyl methacrylate, ethyl methacrylate, butyl methacrylate and lauryl methacrylate.

18. An electrostatic recording material according to claim 15, wherein the halogenated vinyl compounds are vinyl chloride and vinylidene chloride.

19. An electrostatic recording material according to claim 15, wherein the monoolefin is isobutylene.

* * * * *